US008458411B2

(12) United States Patent
Akaike et al.

(10) Patent No.: US 8,458,411 B2
(45) Date of Patent: Jun. 4, 2013

(54) DISTRIBUTED SHARED MEMORY MULTIPROCESSOR AND DATA PROCESSING METHOD

(75) Inventors: Yukihiko Akaike, Kanagawa (KR); Hitoshi Suzuki, Kanagawa (KR)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 532 days.

(21) Appl. No.: 12/461,812

(22) Filed: Aug. 25, 2009

(65) Prior Publication Data

US 2010/0058001 A1 Mar. 4, 2010

(30) Foreign Application Priority Data

Aug. 29, 2008 (JP) ................................ 2008-220730

(51) Int. Cl.
*G06F 13/00* (2006.01)
*G06F 13/28* (2006.01)
*G06F 9/26* (2006.01)
*G06F 9/34* (2006.01)

(52) U.S. Cl.
USPC ........... 711/150; 711/151; 711/152; 711/203; 711/E12.016

(58) Field of Classification Search
None
See application file for complete search history.

(56) References Cited

U.S. PATENT DOCUMENTS 5,592,625 A * 1/1997 Sandberg ...................... 711/147
2005/0050283 A1* 3/2005 Miller et al. .................. 711/150

FOREIGN PATENT DOCUMENTS

| JP | 2-81255 A | 3/1990 |
| JP | 4-333962 A | 11/1992 |
| JP | 5-290000 A | 11/1993 |
| JP | 7-160655 A | 6/1995 |

* cited by examiner

*Primary Examiner* — Reginald Bragdon
*Assistant Examiner* — Eric S Cardwell
(74) *Attorney, Agent, or Firm* — McGinn IP Law Group, PLLC

(57) ABSTRACT

A distributed shared memory multiprocessor that includes a first processing element, a first memory which is a local memory of the first processing element, a second processing element connected to the first processing element via a bus, a second memory which is a local memory of the second processing element, a virtual shared memory region, where physical addresses of the first memory and the second memory are associated for one logical address in a logical address space of a shared memory having the first memory and the second memory, and an arbiter which suspends an access of the first processing element, if there is a write access request from the first processing element to the virtual shared memory region, according to a state of a write access request from the second processing element to the virtual shared memory region.

18 Claims, 6 Drawing Sheets

DISTRIBUTED SHARED MEMORY MULTIPROCESSOR AND DATA PROCESSING METHOD

BACKGROUND

1. Field of the Invention

The present invention relates to a distributed shared memory multiprocessor and a data processing method of the same.

2. Description of Related Art

In recent years, the processing speed of a single processor is approaching the limit and a multiprocessor, which uses multiple processors performing parallel processes, is highlighted and is already in practical application. A multiprocessor is usually provided with a shared memory for multiple processors to access each other. Such multiprocessor is referred to as a shared memory multiprocessor. Further, the shared memory multiprocessors can be roughly divided into a centralized shared memory type where multiple processors are connected to one shared memory, and a distributed shared memory type where multiple processors each have local memories.

FIG. 6 is a pattern diagram of a distributed shared memory multiprocessor to explain the problem to be solved by the present invention. Each of processor elements PE1 and PE2 provided with CPUs respectively includes local memories LM1 and LM2. Further, the processor elements PE1 and PE2 are connected via a bus. Therefore, the processor element PE1 can also access the local memory LM2, and the processor element PE2 can also access the local memory LM1.

Accordingly, the local memories LM1 and LM2 are shared by the two processor elements PE1 and PE2, and are placed at one logical address space. In such distributed shared memory multiprocessor, a processor element can access its own local memory at high speed. On the other hand, it takes time to access local memories of other processor elements as multiple steps of bridges are routed through. Writing can be carried out at relatively high speed by posted write, thus the problem is the time taken for reading out.

In response, Japanese Unexamined Patent Application Publication No. 5-290000 discloses a distributed shared memory multiprocessor which defines a broadcast region in a logical address space. The broadcast region is a region recognized as the same address region by each processor element. On the other hand, the region is actually the region storing the same data in each local memory. If there is a write request to the broadcast region, the same data is written to each local memory. Further, if there is a read request to the broadcast region, data is read out from the own local memory. Thus data can be read out at high speed.

SUMMARY

However, the present inventor has found a problem that in the distributed shared memory multiprocessor disclosed in Japanese Unexamined Patent Application Publication No. 5-290000, there is a difference in the timings to complete writing to the own local memory and complete writing to the local memories of other processors. Therefore, there could be an inconsistency in the data of each local memory, which should be the same.

For example, a case is described hereinafter, in which there are write requests at the same time from the processor elements PE1 and PE2 to the same address in the broadcast region. In such case, the request from the processor element PE1 reaches the local memory LM1 first, and then reaches the local memory LM2. Further, the request of the processor element PE2 reaches the local memory LM2 first, and then reaches the local memory LM1.

Therefore, data is written to the local memory LM1 first by the processor element PE1, and then rewritten by the processor element PE2. On the other hand, data is written to the local memory LM2 first by the processor element PE2, and then rewritten by the processor element PE1. Thus, there is an inconsistency generated in the data written to the local memories LM1 and LM2.

In the abovementioned case, the write requests from each processor element are not competitive in memory interfaces MIF1 and MIF2. Accordingly, the abovementioned data inconsistency cannot be prevented by arbiters (not shown) provided to the memory interfaces MIF1 and MIF2.

A first exemplary aspect of the present invention is a distributed shared memory multiprocessor that includes a first processing element, a first memory which is a local memory of the first processing element, a second processing element connected to the first processing element via a bus, a second memory which is a local memory of the second processing element, a virtual shared memory region, where physical addresses of the first memory and the second memory are associated for one logical address in a logical address space of a shared memory having the first memory and the second memory, and an arbiter which suspends an access of the first processing element, if there is a write access request from the first processing element to the virtual shared memory region, according to a state of a write access request from the second processing element to the virtual shared memory region.

The present invention provides a distributed shared memory multiprocessor which is capable of high-speed reading and also prevents inconsistencies in the data between the local memories.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Hereafter, specific exemplary embodiments incorporating the present invention are described in detail with reference to the drawings. However, the present invention is not necessarily limited to the following exemplary embodiments. The explanation and drawings below are simplified as appropriate for clarity of explanation.

First Exemplary Embodiment

Figure 1:
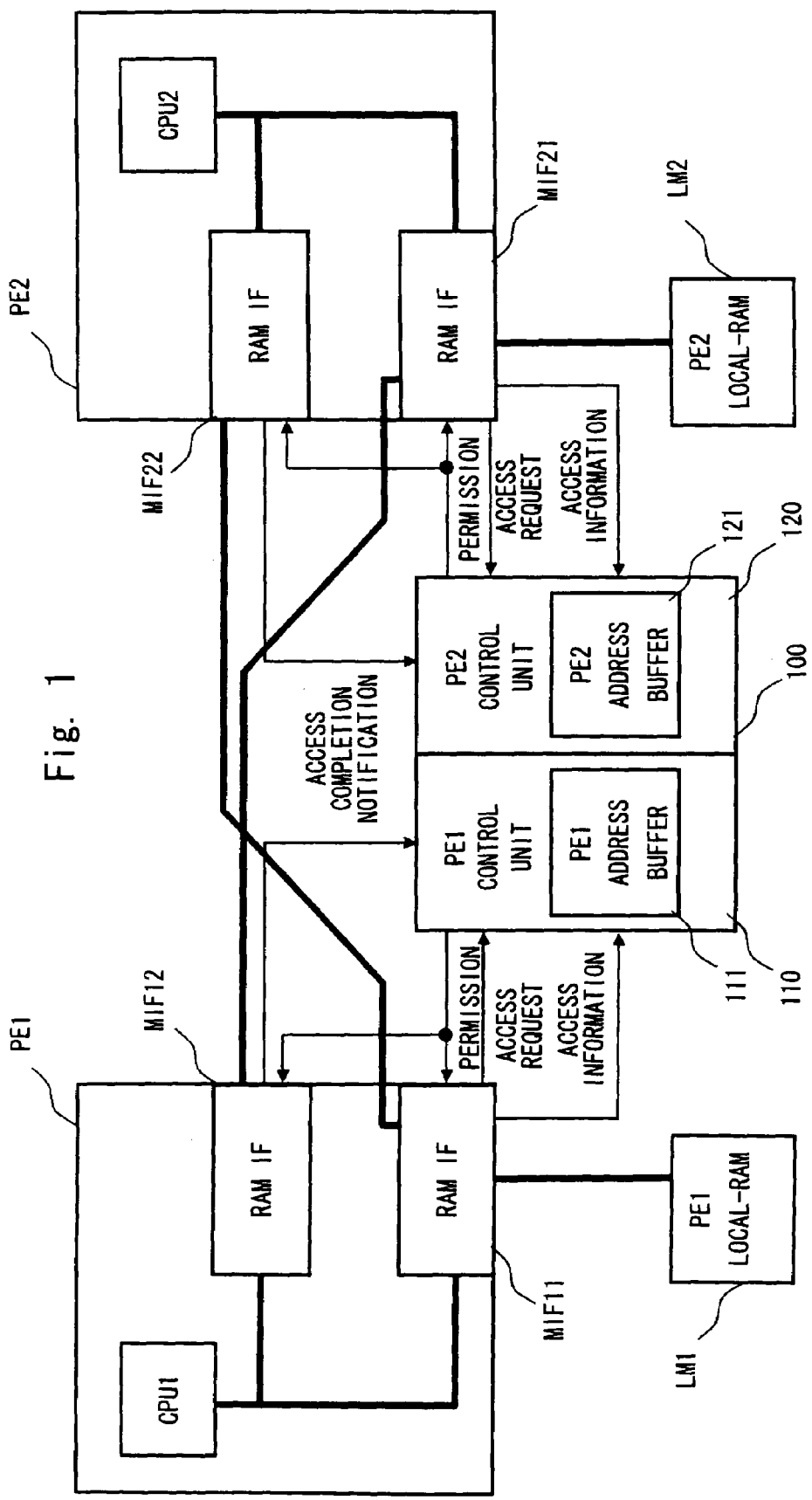
FIG. 1 is a block diagram illustrating a distributed shared memory multiprocessor according to a first exemplary embodiment of the present invention.

Hereinafter, an exemplary embodiment of the present invention is described with reference to the drawings. FIG. 1 is a block diagram of a distributed shared memory multiprocessor according to a first exemplary embodiment. As shown in FIG. 1, the multiprocessor according to the first exemplary embodiment includes a processor element PE1, a processor element PE2, a local memory LM1, a local memory LM2, and a synchronous window arbiter 100. Note that this exemplary embodiment is a typical example of a distributed shared memory multiprocessor provided with a plurality of processors and a local memory for each of the processors, and needless to say, that the numbers of the processors and the local memories are not limited to two.

The processor element PE1 includes a CPU1, a RAM interface MIF11, and a RAM interface between PEs MIF12. The CPU1 is connected to the RAM interface between PEs MIF11 and the RAM interface between PEs MIF12 via a bus. The RAM interface MIF11 is connected to the local memory LM1, which is a local RAM of the processor element PE1, via a bus. Thus the CPU1 can access the local memory LM1.

The processor element PE2 includes a CPU2, the RAM interface MIF12, and a RAM interface between PEs MIF22. The CPU2 is connected to the RAM interface MIF21 and the RAM interface between PEs MIF22 via a bus. The RAM interface MIF21 is connected to the local memory LM2, which is a local RAM of the processor element PE2, via a bus. Thus the CPU1 can access the local memory LM2.

Further, the RAM interface between PEs MIF12 of the processor element PE1 is connected to the RAM interface MIF21 of the processor element PE2 via a bus. Thus the CPU1 can also access the local memory LM2. On the other hand, the RAM interface between PEs MIF22 of the processor element PE2 is connected to the RAM interface MIF11 of the processor element PE1 via a bus. Thus the CPU2 can also access the local memory LM1.

In this way, the local memories LM1 and LM2 are shared by the two processor elements PE1 and PE2, and are placed at one logical address space. Further, the distributed shared memory multiprocessor according to the first exemplary embodiment includes a virtual shared memory region, which is recognized as the same address region by the processor elements PE1 and PE2. Such memory region is referred to as a synchronous window region in this document. The above-mentioned region is referred to as the broadcast region in Japanese Unexamined Patent Application Publication No. 5-290000.

The synchronous window region is actually the region to store the same data in each local memory. If there is a write request to the synchronous window region, the same data is written to each local memory. Further, if there is a read request to the synchronous window region, data is read out from the own local memory. This enables a high-speed reading.

Figure 2:
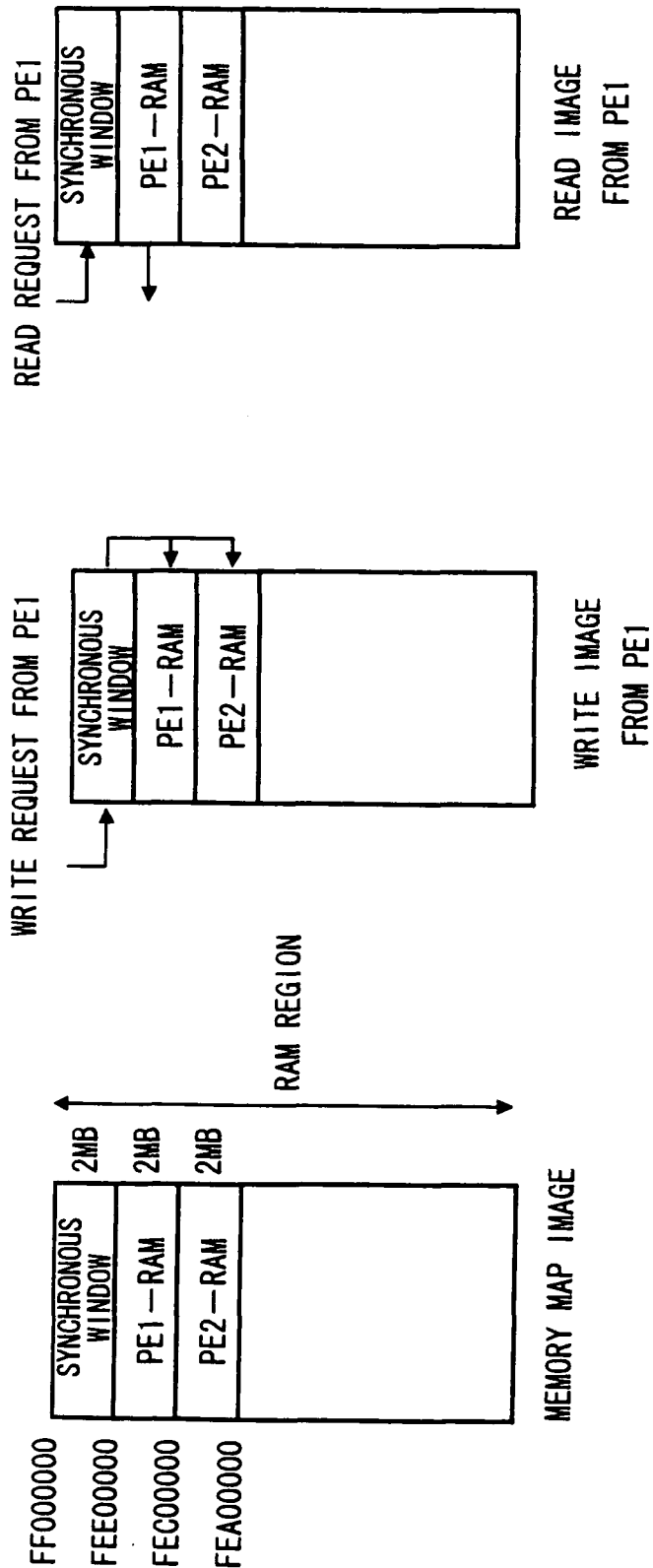
FIGS. 2A to 2C are memory map images of a shared memory.

The synchronous window region is described in further detail with reference to FIGS. 2A to 2C. FIG. 2A is a memory map image of a shared memory in the distributed shared memory multiprocessor according to the first exemplary embodiment. As shown in the memory map of FIG. 2A, a memory region (PE1-RAM in FIG. 2A) of the local memory LM1, which is a local RAM of the processor element PE1, a memory region (PE2-RAM in FIG. 2A) of the local memory LM2, which is a local RAM of the processor element PE2, and the synchronous window region are defined.

In FIG. 2A, the capacities of the three regions are all 2 MB. The synchronous window region is specified by logical addresses FEE00000 to FEFFFFFF. The local memory region PE1-RAM is specified by logical addresses FEC00000 to FEDFFFFF. The local memory region PE2-RAM is specified by logical addresses FEA00000 to FEBFFFFF.

FIG. 2B illustrates a case when there is a write request from the processor element PE1. For example, if there is a write request from the processor element PE1 to the logical address FEE00100 of the synchronous window region, the same data is written to the physical address 00100 of the local memory region PE1-RAM and the local memory region PE2-RAM. The similar operation is carried out for a write request from the processor element PE2.

FIG. 2C illustrates a case when there is a read request from the processor element PE1. For example, if there is a read request to the logical address FEE00100 of the synchronous window region from the processor element PE1, data is read out from the physical address 00100 of the own local memory region PE1-RAM. Note that similarly for a read request from the processor element PE2, data is read out from the own local memory region PE2-RAM.

The synchronous window arbiter 100 is responsible for arbitrating between a write access from the processor element PE1 and a write access from the processor element PE2. No arbitration is needed for a read access, as each processor element only accesses to its own local memory. The synchronous window arbiter 100 includes a PE1 control unit 110 and a PE2 control unit 120. The PE1 control unit 110 and the PE2 control unit 120 respectively include a PE1 address buffer 111 and a PE2 address buffer 121.

An operation is described hereinafter when there is a write access request from the processor element PE1 with reference to FIG. 1. In the case of a write access, the RAM interface MIF11 outputs an access request to the PE1 control unit 110 of the synchronous window arbiter 100. Further, access information, such as a target address, a lock request, and an access type (read/write), is also input to the PE1 control unit of the synchronous window arbiter 100 from the RAM interface MIF11. The target address is registered to the PE1 address buffer 111. Note that if there is only a read access, an access request will not be output from the RAM interface MIF11. However in case of an atomic access that includes both reading and writing such as read-modify-write, the RAM interface MIF11 outputs an access request.

If the same address as the access request address is not registered to the PE2 address buffer 121, the synchronous window arbiter 100 immediately outputs an access permission to the processor element PE1. On the other hand, if the same address as the access request address is registered to the PE2 address buffer 121, the synchronous window arbiter 100 outputs an access permission to the processor element PE1 after the PE2 address buffer 121 is released. That is, first access request is prioritized. This access permission is input to the RAM interface MIF11 and the RAM interface between PEs MIF12.

Then, in response to an access completion notification from the RAM interface between PEs MIF12 of the processor element PE1, the PE1 address buffer 111 is released. The same operation is carried out for an access request from the processor element PE2. If there are access requests at the same time from the processor elements PE1 and PE2, the access order may be determined according to a predetermined agreement. In this embodiment, the processor element permitted last time is kept wait.

As described above, a writing access from each processor element obtains a permission from the synchronous window arbiter 100 to be processed. Therefore, there is no inconsistency generated in the data that should be the same.

Figure 3:
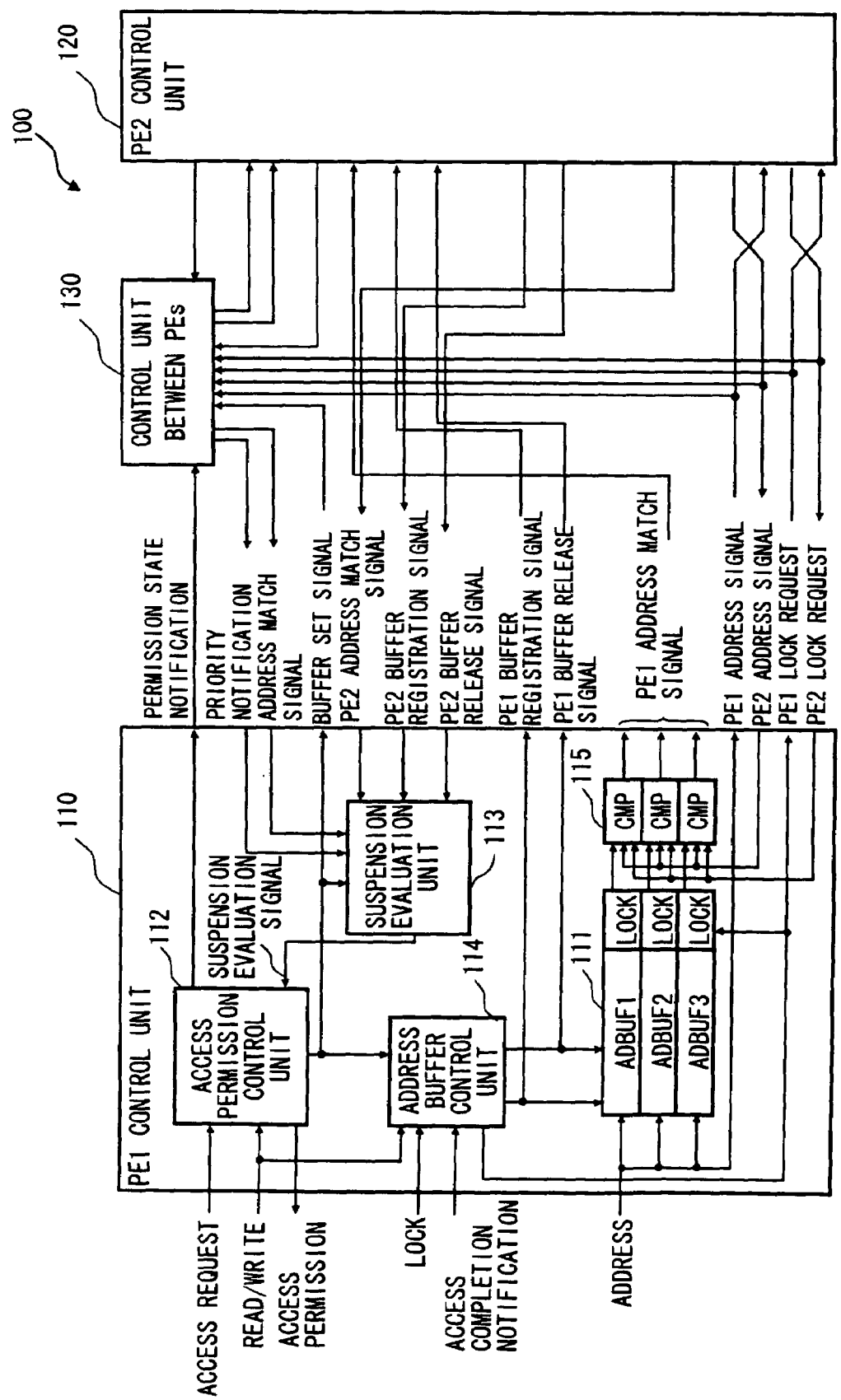
FIG. 3 is a detailed block diagram illustrating a synchronous window arbiter 100.

FIG. 3 is a detailed block diagram of the synchronous window arbiter 100. The synchronous window arbiter 100 includes a PE1 control unit 110, a PE2 control unit 120, and a control unit between PEs 130. Further, the PE1 control unit 110 includes an address buffer 111, an access permission control unit 112, a suspension evaluation unit 113, an address buffer control unit 114, and a comparator 115.

The access permission control unit 112 is connected to the suspension evaluation unit 113 and the address buffer control unit 114. The address buffer control unit 114 is connected to the address buffer 111. There are three address buffers 111 provided in FIG. 3. Further, three comparators 115 are also provided. Each address buffer 111 is respectively connected to each comparator 115. The number of the address buffers is preferably the same as the number of buffers included in the RAM interfaces MIF12 and MIF22. The number of the buffers is not limited to three, however it should preferably be multiple steps in order to enable to register multiple addresses. The details of the PE2 control unit 120 are same as the PE1 control unit 110, thus the explanation is omitted.

The operation of the synchronous window arbiter 100 is described in detail with reference to FIG. 3. Hereinafter, a case is described, in which access requests from the processor element PE1 and the processor element PE2 are not simultaneous. An access with a lock is described later. The control unit between PEs 130 does not concern as the access requests from the processor element PE1 and the processor element PE2 are not simultaneous.

Firstly, a read/write signal and an address (address) signal are input to the PE1 control unit 110 along with an access request signal from the processor element PE1. The access request is input to the access permission control unit 112. The read/write signal is input to the access permission control unit 112 and the address buffer control unit 114. The address signal is input to the address buffer 111. Further, this address signal (PE1 address signal) is input also to the processor element PE2.

In response to the access request, the access permission control unit 112 outputs a buffer set signal to the address buffer control unit 114 and the suspension evaluation unit 113. The address buffer control unit 114 outputs a buffer registration signal (PE1 buffer registration signal) to the address buffer 111 according to the buffer set signal. This enables a request address to be registered to the address buffer 111. Further, the PE1 buffer registration signal output from the address buffer control unit 114 is input also to the suspension evaluation unit 113 of the processor element PE2, and is used for the suspension evaluation in the processor element PE2.

On the other hand, the buffer set signal triggers the suspension evaluation unit 113 to generate a suspension evaluation signal of either "permitted" or "suspended" according to a PE2 address match signal, a PE2 buffer registration signal, and a PE2 buffer release signal, which are input from the processor element PE2. Specifically, if the address registered to the address buffer 121 of the processor element PE2 matches the access request address from PE1, the signal is "suspended", otherwise the signal is "permitted". This signal is input to the access permission control unit 112. If the access is permitted, the access permission control unit 112 outputs an access permission signal to the processor element PE1. Furthermore, the access permission control unit 112 outputs a permission status notification to the control unit between PEs 130.

At a completion of accesses to both of the local memories, an access completion notification is input to the address buffer control unit 114. In response to the access completion notification, the address buffer control unit 114 outputs a buffer release signal (PE1 buffer release signal) to the address buffer 111. Then the address buffer 111 where the address is registered is released. Further, the PE1 buffer release signal output from the address buffer control unit 114 is input also to the suspension evaluation unit 113 of the processor element PE2, and is used for suspension evaluation in the processor element PE2.

The address registered to the address buffer 111 is input to the comparator 115. If there is an access request of the processor element PE2, the comparator 115 compares the address (PE2 address signal) with the address registered to the address buffer 111, and generates a PE1 address match signal. This signal is input to the suspension evaluation unit 113 of the processor element PE2, and is used for suspension evaluation in the processor element PE2.

Next, a case is described, in which access requests from the processor elements PE1 and PE2 are simultaneous. An access with a lock is described later. In this case, the control unit between PEs 130 concerns as the access requests from the processor elements PE1 and PE2 are simultaneous.

The PE1 address signal and the PE2 address signal are input to the control unit between PEs 130. The buffer set signal and the permission state notification are input to the control unit between PEs 130 from the processor elements PE1 and PE2. The control unit between PEs 130 can determine whether the access requests are simultaneous based on the buffer set signal from the processor elements PE1 and PE2. Further, the control unit 130 can determine whether the access request address matches according to the PE1 address signal and the PE2 address signal.

If the access requests are simultaneous and also the addresses of the accesses match, the control unit between PEs 130 outputs an address match signal and a priority notification to the processor elements PE1 and PE2. The priority notification indicates the priority of the processor elements to be permitted, and is generated according to the permission state notification. In this embodiment, the processor element permitted last time is kept wait and the other one is permitted. The address match signal and the priority notification are input to the suspension evaluation unit 113 of each processor element. The suspension evaluation unit 113 generates a suspension evaluation signal based on such information. Other operations are same as the operation when the accesses are not simultaneous.

An access with a lock is described hereinafter. If there is an access request with a lock from the processor element PE1, a lock signal is input to the PE1 control unit 110 in addition to the access request signal, the read/write signal, and the address signal. To be more specific, the lock signal is input to the address buffer control unit 114. The address buffer control unit 114 outputs a lock request (PE1 lock request) based on the lock signal. The lock request is input to the address buffer 111. In this case, the comparator 115 outputs the address match signal, indicating a match of the addresses. The PE1 lock request is input also to the comparator 115 of the PE2 control unit.

On the other hand, if there is an access request with a lock from the processor element PE2, the lock request (PE2 lock request) from the processor element PE2 is input to the comparator 115 of the processor element PE1. Also in this case, the comparator 115 outputs the address match signal, indicating a match of the addresses.

Further, the PE1 lock request and the PE2 lock request are input also to the control unit between PE130. Therefore, if there are access requests simultaneously and at least one of them requires a lock, the control unit between PEs 130 regards that the addresses match and outputs the address match signal.

As described above, as for write access requests with a lock, the addresses are regarded to match even if the access request address from the other processor do not match the address. When trying to perform a competitive evaluation of related access addresses for an atomic access with a lock, hardware configuration required for the address evaluation becomes complicated. However this exemplary embodiment achieves a simple hardware configuration. An atomic access with a lock originally suspends accesses from other processor elements by a lock. Thus there are few disadvantages for the processing speed by the abovementioned processes.

Figure 4:
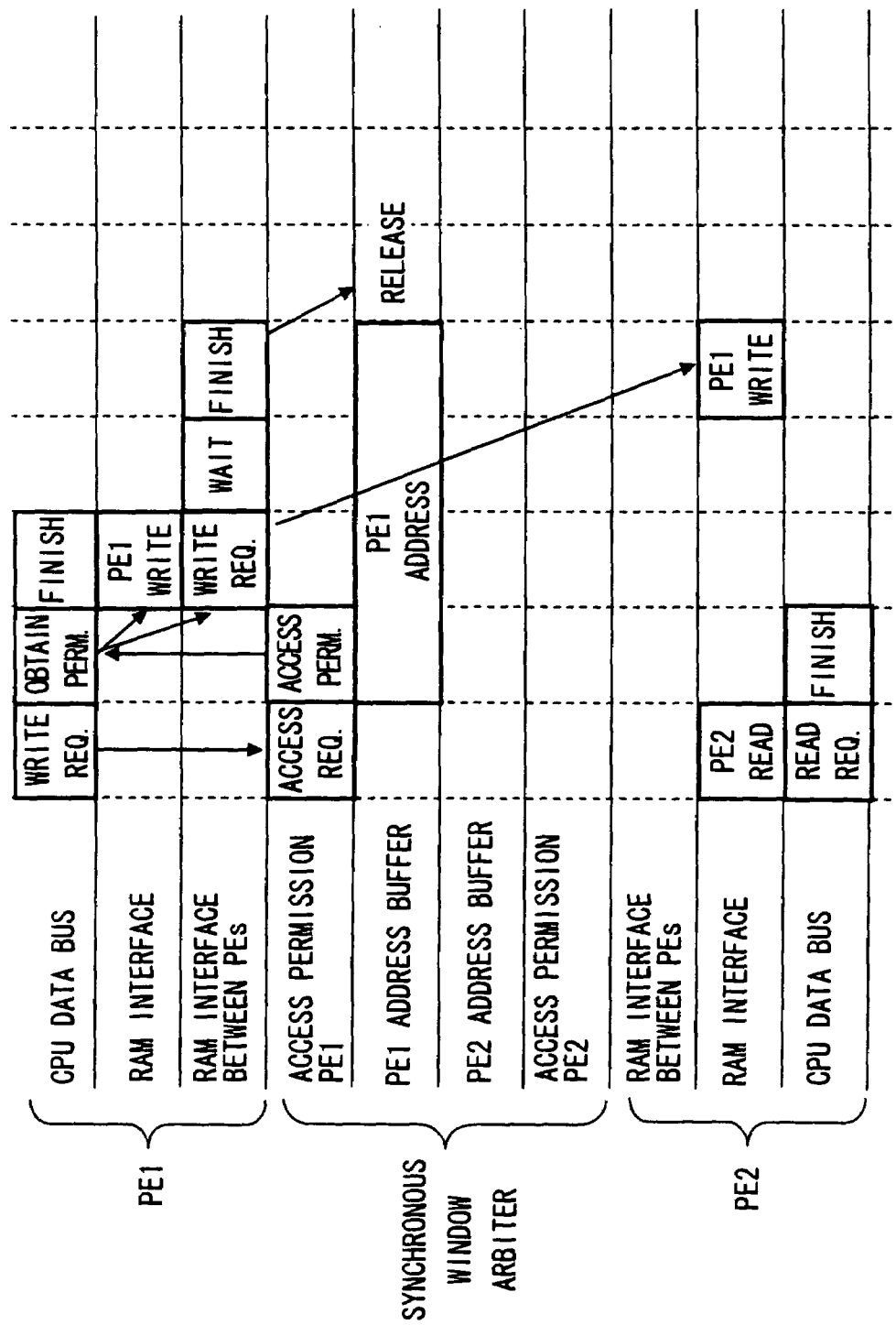
FIG. 4 is a timing chart indicating operation timings of the distributed shared memory multiprocessor according to the first exemplary embodiment of the present invention.

Next, the operation is explained with reference to the timing charts of FIGS. 4 and 5, and FIG. 1. FIG. 4 illustrates a case in which the processor element PE1 issues a write request and the processor element PE2 issues a read request to the same address in the synchronous window region. In order to read, accesses are made only to the own local memories. Therefore no access permission is required. Thus the CPU2 of the processor element PE2 does not wait and reads out data from the own local memory LM2 via the RAM interface MIF21. Then the operation is completed.

On the other hand, the CPU1 of the processor element PE1 issues an access request to the synchronous window arbiter 100 via a data bus. Then, an access request address is registered to the address buffer 111 for the processor element PE1. In the example of FIG. 4, there is no competition generated, as the request from the processor element PE2 is a read. Accordingly, an access permission is immediately output from the synchronous window arbiter 100. The CPU 1 writes data to the own local memory LM1 via the RAM interface MIF11 according to the access permission. Further, a write request is issued to the RAM interface between PEs MIF12 by posted write method. Then the operation of the CPU1 is completed.

After that, the data held in the RAM interface between PEs MIF12 is written to the local memory LM2 via the RAM interface MIF21 of the processor element PE2. Then the operation of the RAM interface between PEs MIF12 is completed. After that, the address buffer 111 for the processor element PE1 is released.

Figure 5:
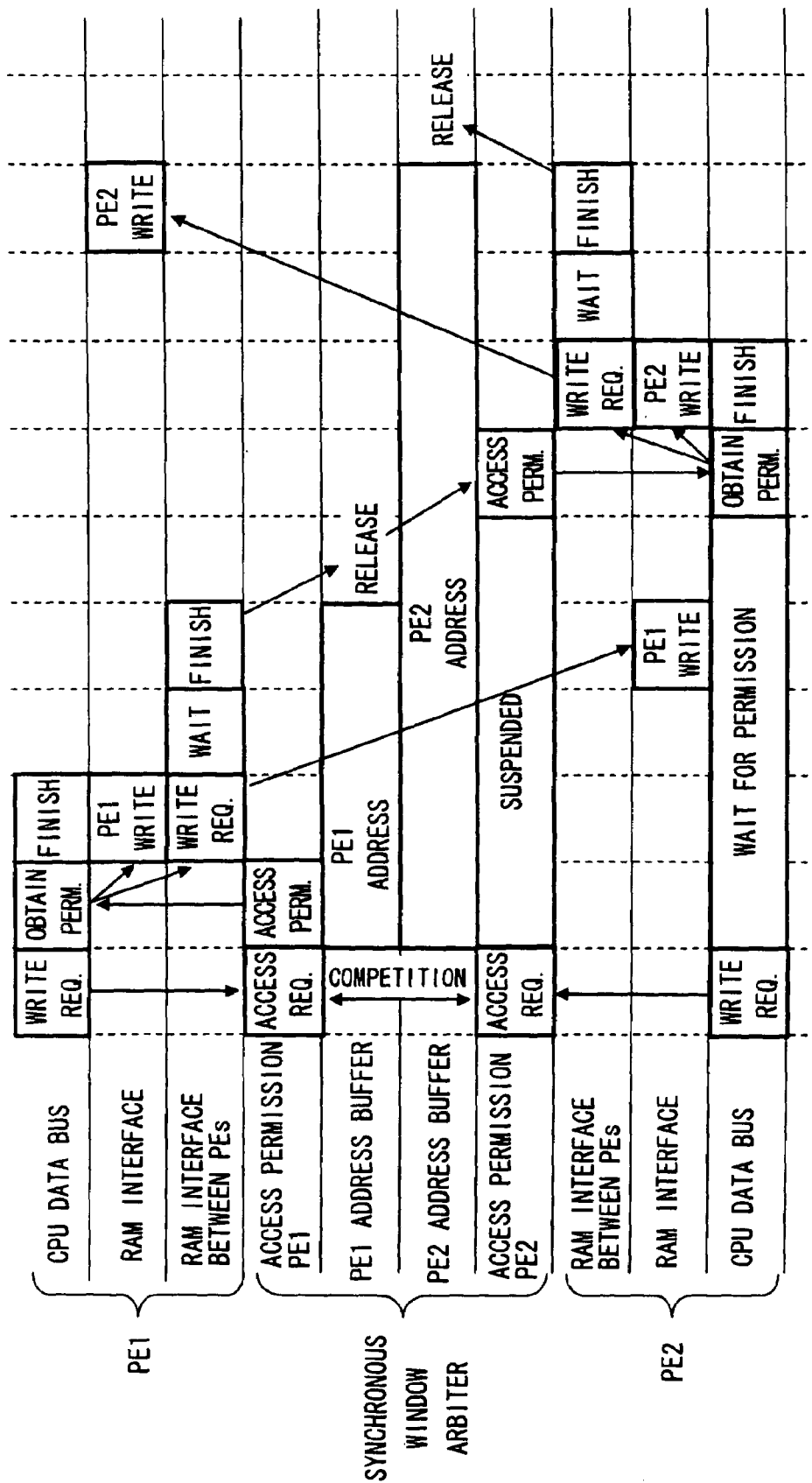
FIG. 5 is a timing chart indicating operation timings of the distributed shared memory multiprocessor according to the first exemplary embodiment of the present invention.
Figure 6:
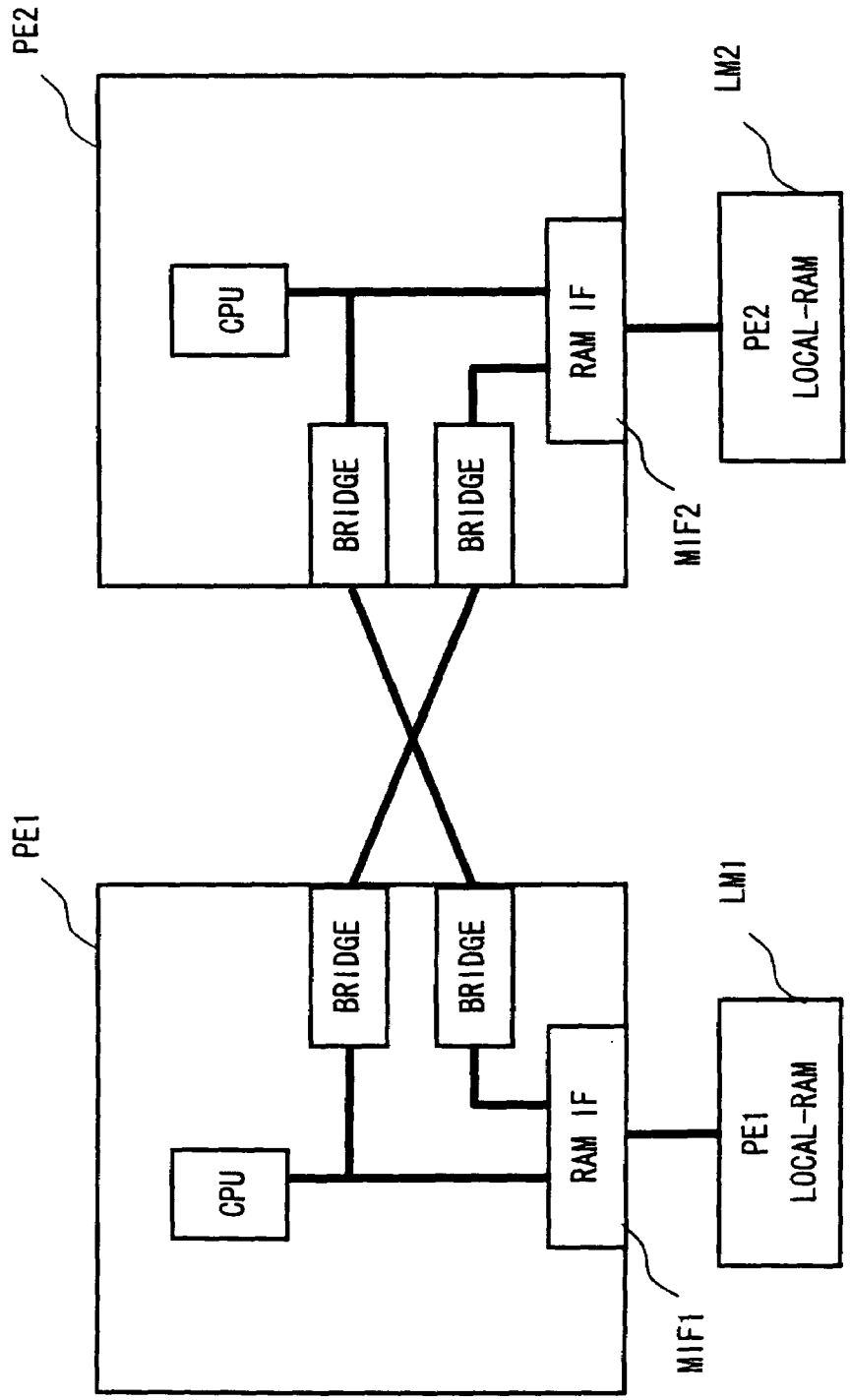
FIG. 6 explains the problem to be solved by the present invention.

FIG. 5 is a timing chart when the processor elements PE1 and PE2 issue write requests to the same address in the synchronous window region. Moreover, FIG. 5 illustrates a case in which the access requests are issued at the same time and the processor element PE1 is prioritized. Note that this applies to when an access from the processor element PE1 is issued first.

The CPU1 of the processor element PE1 issues an access request to the synchronous window arbiter 100 via a data bus. Then, an access request address is registered to the address buffer 111 for the processor element PE1. On the other hand, the CPU2 of the processor element PE2 issues an access request to the synchronous window arbiter 100 via a data bus. Then, an access request address is registered to the address buffer 121 for the processor element PE2.

In the example of FIG. 5, a competition is generated, as the requests from both processor elements are write. First, the synchronous window arbiter 100 outputs an access permission to the processor element PE1. The CPU1 writes data to the own local memory LM1 via the RAM interface MIF11 according to the access permission. Further, a write request is made to the RAM interface between PEs 12 by the posted write method. Then the operation of the CPU1 is completed.

After that, the data held in the RAM interface between PEs MIF12 is written to the local memory LM2 via the RAM interface MIF21 of the processor element PE2. Then the operation of the RAM interface between PEs MIF12 is completed. Then, the address buffer 111 for the processor element PE1 is released.

If the abovementioned address buffer 111 is released, the access permission for the processor element PE2 suspended till then is output from the synchronous window arbiter 100. The CPU2 writes data to the own local memory LM2 via the RAM interface MIF21 according to the access permission. Further, a write request is made to the RAM interface between PEs MIF22 by the posted write method. Then the operation of the CPU2 is completed.

After that, the data held in the RAM interface between PEs MIF22 is written to the local memory LM1 via the RAM interface MIF11 of the processor element PE1. Then the operation of the RAM interface between PEs MIF22 is completed. Then, the address buffer 121 for the processor element PE2 is released.

As described above, the distributed shared memory multiprocessor according to the exemplary embodiment of the present invention is capable of high-speed readout by the synchronous window included therein. Further, as the synchronous window arbiter 100 is included, no inconsistency is generated in the data stored in each local memory that should be the same. Furthermore, the multiprocessor determines that a competition is generated only for write requests with access request addresses matched, thereby keeping the opportunity for suspension to the minimum and enabling high-speed processes. Moreover, an access request with a lock is considered that the addresses are matched, and this enables to eliminate hardware necessary for address evaluation of related accesses and also achieve a simple configuration.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A distributed shared memory multiprocessor, comprising:
   a first processing element;
   a first memory, the first memory being a local memory of the first processing element;
   a second processing element connected to the first processing element via a bus;
   a second memory, the second memory being a local memory of the second processing element;
   a virtual shared memory region, where physical addresses of the first memory and the second memory are associated for one logical address in a logical address space of a shared memory including the first memory and the second memory; and
   an arbiter which arbitrates between a first write access request from the first processing element to the virtual shared memory region and a second write access request from the second processing element to the virtual shared memory region,
   wherein the arbiter comprises a first processing element control unit and a second processing element control unit,
   wherein the first processing element control unit comprises a first access permission control unit, a first address buffer control unit, a first suspension evaluation unit, a first address buffer, and a first comparator, wherein the second processing element control unit comprises a second access permission control unit, a second address buffer control unit, a second suspension evaluation unit, a second address buffer, and a second comparator, wherein a first address of the first write access request is registered in the first address buffer and a second address of the second write access request is registered in the second address buffer, wherein the first address is output from the first address buffer to the second comparator and the second address is output from the second address buffer to the first comparator, wherein the second comparator compares the first address with the second address, judges whether the first and second addresses are the same, and outputs a second judging result to the first suspension evaluation unit, wherein the first suspension evaluation unit outputs a first suspension evaluation signal to the first access permission control unit in a case that the second judging result is not the same according to the first write access request, wherein the first access permission control unit outputs a access permission signal to the first processing element according to the first suspension evaluation signal, and wherein the first address buffer control unit outputs a first release signal which releases the first address from the first address buffer when the first processing element completes write accesses to the physical addresses of the first and second memory associated with the first address.

2. The distributed shared memory multiprocessor according to claim 1, wherein if an address in the virtual shared memory region, for which an access request is made by the first processing element, matches an address in the virtual shared memory region, for which an access request is made by the second processing element, the arbiter suspends an access of the first processing element.

3. The distributed shared memory multiprocessor according to claim 2, wherein the first address buffer registers the address in the virtual shared memory region, for which the access request is made by the first processing element, and wherein the second address buffer registers the address in the virtual shared memory region, for which the access request is made by the second processing element.

4. The distributed shared memory multiprocessor according to claim 3, wherein the first and second address buffers are respectively comprise a plurality of address buffers.

5. The distributed shared memory multiprocessor according to claim 4, wherein, if at least one of the access requests from the first processing element and the second processing element comprises a lock, the addresses are regarded to match.

6. The distributed shared memory multiprocessor according to claim 3, wherein, if at least one of the access requests from the first processing element and the second processing element comprises a lock, the addresses are regarded to match.

7. The distributed shared memory multiprocessor according to claim 2, wherein, if at least one of the access requests from the first and second processing elements comprises a lock, the addresses are regarded to match.

8. The distributed shared multiprocessor according to claim 1, wherein, if there is a read access request to the virtual shared memory region from the first processing element, then data associated with the read access request is read from the local memory of the first processing element.

9. The distributed shared multiprocessor according to claim 1, wherein, if there is a write access request from either the first or second processing element to the virtual shared memory region, then a same data is written to the local memory of the first processing element and the local memory of the second processing element.

10. The distributed shared multiprocessor according to claim 1, wherein, if the arbiter receives the second write access request from the second processing element at a same time that the arbiter receives the first write access request from the first processing element, then an access order of the first write access request of the first processing element and the second write access request of the second processing element are determined according to a predetermined agreement.

11. The distributed shared multiprocessor according to claim 10, wherein the predetermined agreement permits the first write access request of first processing element, if the predetermined agreement permitted the second write access request of the second processing element previously.

12. The distributed shared multiprocessor according to claim 1, wherein the arbiter suspends an access of the first processing element to the virtual shared memory region, when the first processing element makes an access request for a first address in the virtual shared memory region and the second processing element makes an access request for the first address in the virtual shared memory region.

13. The distributed shared memory multiprocessor according to claim 1, wherein, when the arbiter receives an access request from the first processor element and the second processor element at a same time, the first address buffer registers the access request address of the access request from the first processor element and the second address buffer registers the access request address of the access request from the second processor element.

14. The distributed shared memory multiprocessor according to claim 1, wherein, if the arbiter suspends an access of the first processing element to the virtual shared memory, then the second write access request of the second processing element is granted before the arbiter releases the access of the first processing element to the virtual shared memory.

15. The distributed shared memory multiprocessor according to claim 14, wherein the first write access request of the first processing element is permitted before the arbiter suspends the access of the first processing element to the virtual shared memory region again.

16. A method of processing data of a distributed shared memory multiprocessor which comprises:

a first processing element;

a first memory, the first memory being a local memory of the first processing element;

a second processing element connected to the first processing element via a bus;

a second memory, the second memory being a local memory of the second processing element;

a virtual shared memory region, where physical addresses of the first memory and the second memory are associated for one logical address in a logical address space of a shared memory including the first memory and the second memory; and an arbiter, the method comprising:

arbitrating, by the arbiter, between a first write access request from the first processing element to the virtual shared memory region and a second write access request from the second processing element to the virtual shared memory region, wherein the arbiter comprises a first processing element control unit and a second processing element control unit, wherein the first processing element control unit comprises a first access permission control unit, a first address buffer control unit, a first suspension evaluation unit, a first address buffer, and a first comparator, wherein the second processing element control unit comprises a second access permission control unit, a second address buffer control unit, a second suspension evaluation unit, a second address buffer, and a second comparator, wherein a first address of the first write access request is registered in the first address buffer and a second address of the second write access request is registered in the second address buffer, wherein the first address is output from the first address buffer to the second comparator and the second address is output from the second address buffer to the first comparator, wherein the second comparator compares the first address with the second address, judges whether the first and second addresses are the same, and outputs a second judging result to the first suspension evaluation unit, wherein the first suspension evaluation unit outputs a first suspension evaluation signal to the first access permission control unit in a case that the second judging result is not the same according to the first write access request, wherein the first access permission control unit outputs a access permission signal to the first processing element according to the first suspension evaluation signal, and wherein the first address buffer control unit outputs a first release signal which releases the first address from the first address buffer when the first processing element completes write accesses to the physical addresses of the first and second memory associated with the first address.

17. The method according to claim 16, wherein an access of the first processing element is suspended if an address in the virtual shared memory region, for which an access request is made by the first processing element, matches an address in the virtual shared memory region, for which an access request is made by the second processing element.

18. The method according to claim 17, wherein, if at least one of the access requests from the first and second processing elements comprises a lock, the addresses are regarded to match.

* * * * *